United States Patent
Bruce et al.

(10) Patent No.: US 7,207,880 B2
(45) Date of Patent: Apr. 24, 2007

(54) CONTOUR FOLLOWING LOIN PULLER APPARATUS

(75) Inventors: Richard S. Bruce, Knoxville, TN (US); Scott E. Andre, Cincinnati, OH (US); Lawrence D. Boody, Oliver Springs, TN (US)

(73) Assignee: Acraloc Corporation, Oak Ridge, TN (US)

( * ) Notice: Subject to any disclaimer, the term of this patent is extended or adjusted under 35 U.S.C. 154(b) by 0 days.

(21) Appl. No.: 10/891,465

(22) Filed: Jul. 14, 2004

(65) Prior Publication Data

US 2006/0035576 A1 Feb. 16, 2006

(51) Int. Cl.
    *A22C 18/00* (2006.01)
(52) U.S. Cl. ..................................... 452/171
(58) Field of Classification Search ............. 452/150, 452/156, 136, 157, 148, 171
    See application file for complete search history.

(56) References Cited

U.S. PATENT DOCUMENTS

| | | | |
|---|---|---|---|
| 4,189,806 A * | 2/1980 | Van Heyningen | 452/134 |
| 5,234,371 A * | 8/1993 | Andre et al. | 452/171 |
| 5,295,898 A * | 3/1994 | Andre et al. | 452/171 |
| 5,407,384 A | 4/1995 | Boody et al. | |
| 5,882,252 A * | 3/1999 | Boody et al. | 452/171 |
| 6,089,968 A * | 7/2000 | Andre et al. | 452/171 |
| 6,155,919 A * | 12/2000 | Haagensen et al. | 452/171 |
| 6,336,856 B1 * | 1/2002 | Dufour et al. | 452/171 |
| 6,547,658 B2 * | 4/2003 | Boody et al. | 452/171 |
| 2005/0221749 A1 | 10/2005 | Couture et al. | |

* cited by examiner

Primary Examiner—Thomas Price
(74) Attorney, Agent, or Firm—Pitts & Brittian, PC (57) ABSTRACT

A contour-following loin puller for separating the loin from the belly through the finger lean. The contour-following loin puller follows the contour of the surface rib line through at least one rib height sensor and positions the z-blade relative to the surface rib line. The contour-following loin puller offers the ability to greatly increase yield by automating the separation of the loin and the belly to produce finger lean even on thin, soft or nearly frozen product which is very difficult to manipulate manually.

19 Claims, 7 Drawing Sheets

CONTOUR FOLLOWING LOIN PULLER APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

The present invention relates to an apparatus and a method used in the meat processing industry to separate a loin portion from carcass halves. More particularly, the present invention automatically follows the contour of the surface rib line to improve the quality of the cut separating the loin and the belly.

2. Description of the Related Art

In the field of meat processing, the quality of the separation of the loin and the belly greatly impacts the value of the two cuts of meat. Using pork processing as an example, the first step is to halve the carcass by cutting it into equal sides through the center of the backbone. Each carcass side is processed to remove the hindquarter and the forequarter. The remaining middle portion of the carcass contains the loin and belly. The carcass middle is cut to separate the loin and the belly.

Various devices have been developed that automate the process of separating the loin from the belly. One example of such a device is described in U.S. Pat. No. 5,234,371, issued to L. George Andre, et al., on Aug. 10, 1993. Another example is described in U.S. Pat. No. 5,295,898, issued to L. George Andre, et al., on Mar. 22, 1994. A still further example is described in U.S. Pat. No. 5,407,384, issued to Lawrence D. Boody, et al., on Apr. 18, 1995. U.S. Pat. No. 6,089,968 issued to Scott E. Andre, et al., on Jul. 18, 2000 describes a loin knife assembly having a blade that improves the ability to separate the belly and loin while cutting through the finger lean under the surface rib line. Finally, U.S. Pat. No. 6,547,658, issued to Lawrence D. Boody, et al., on Apr. 15, 2003 describes a dual-blade knife assembly for separating the loin from the belly. Each of these patents is instructive as to the general structure and operation of a machine for automatically recovering the loin, commonly referred to as a "loin puller."

The size and weight of the belly are the determining factors in the valuing the belly cut in commodity bellies. This increases opportunity for achieving exposed lean while maintaining the minimum thickness of the belly edge. Visible lean meat on the belly increases the value of the cut. There is only a small portion of lean meat, referred to as the finger lean, located adjacent to the spare ribs on the belly. The finger lean has a depth of approximately one quarter-of an inch and is located approximately one half-inch below the surface rib line. The ideal cut separating the loin and the belly slices through the entire length of the finger lean, which increases the amount of exposed lean meat on the belly portion effectively increasing the useable size of the belly. Ultimately, the belly is trimmed until there is no more than approximately one half inch of fat between the edge of the belly and the start of the visible lean meat. The trimmings are greatly devalued to approximately one-tenth of the value that the trimmed portions would have if they remained part of the belly. A skilled human operator controlling the blade depth of a loin puller has an accuracy rate of approximately 85–90% when separating the loin and the belly through the finger lean. This results in 10–15% of the products being devalued. Further, it is extremely difficult to produce finger lean on product is thin, soft, or nearly frozen when manually pulling the loin. Accordingly, it is greatly desirable to improve the consistency and quality of the cut separating the loin and the belly to increase the amount of lean meat visible on the belly.

BRIEF SUMMARY OF THE INVENTION

A device for separating the loin from the belly through the finger lean, or contour-following loin puller, constructed in accordance with the present invention, is shown and described. The contour-following loin puller tracks the surface rib line to separate the belly and the loin through the finger lean. The contour-following loin puller offers the ability to greatly increase yield by automating the separation of the loin and the belly to produce finger lean even on thin, soft or nearly frozen product which is very difficult to manipulate manually.

The contour-following loin puller includes a conveyor and at least one chain drive having a series of downwardly-biased guide arms. The chain drives cooperate with the conveyor to move the carcass middle through the loin puller toward the blade area. The loin puller includes a stationary control box from which an operator can control the operation of the loin puller and make adjustments to the cutting profiles. A tethered remote control allows the operator freedom to operate the contour-following loin puller away from the location of the stationary control box. The blade area is home to a scribe saw and a carcass middle blade assembly. The scribe saw cuts through the rib bones at a predetermined depth into the carcass middle. The carcass middle blade assembly includes two separate blades, each with a unique purpose. The first blade, referred to as the "z-blade," separates the loin from the belly. The second blade, referred to as the "j-blade," trims fatback from the loin. A primary height sensor makes early contact and provides an initial height value for the carcass middle and provides advance information about the length of the carcass middle. A secondary height sensor provides height information about the carcass middle proximate to the z-blade where the loin and belly are separated to slice through the finger lean.

A control circuit automates the operation of the contour-following loin puller using information from a primary height sensor and a secondary height sensor and precisely controls the separation of the loin and the belly with a high degree of accuracy. The primary height sensor provides an initial height measurement allowing the control circuit to set the preliminary position of the z-blade and the j-blade. The secondary height sensor measures the surface height of the rib line allowing the control circuit to position the z-blade to cut just below the ribs and through the finger lean when separating the loin from the belly. The position of the z-blade is adjusted relative to the measured surface height of the rib line.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A device for separating the loin from the belly through the finger lean, or contour-following loin puller, constructed in accordance with the present invention, is illustrated generally at 100 in the figures. The contour-following loin puller 100 tracks the surface rib line to separate the belly and the loin through the finger lean. The contour-following loin puller 100 offers the ability to greatly increase yield by automating the separation of the loin and the belly to produce finger lean even on thin, soft or nearly frozen product which is very difficult to manipulate manually.

Figure 1:
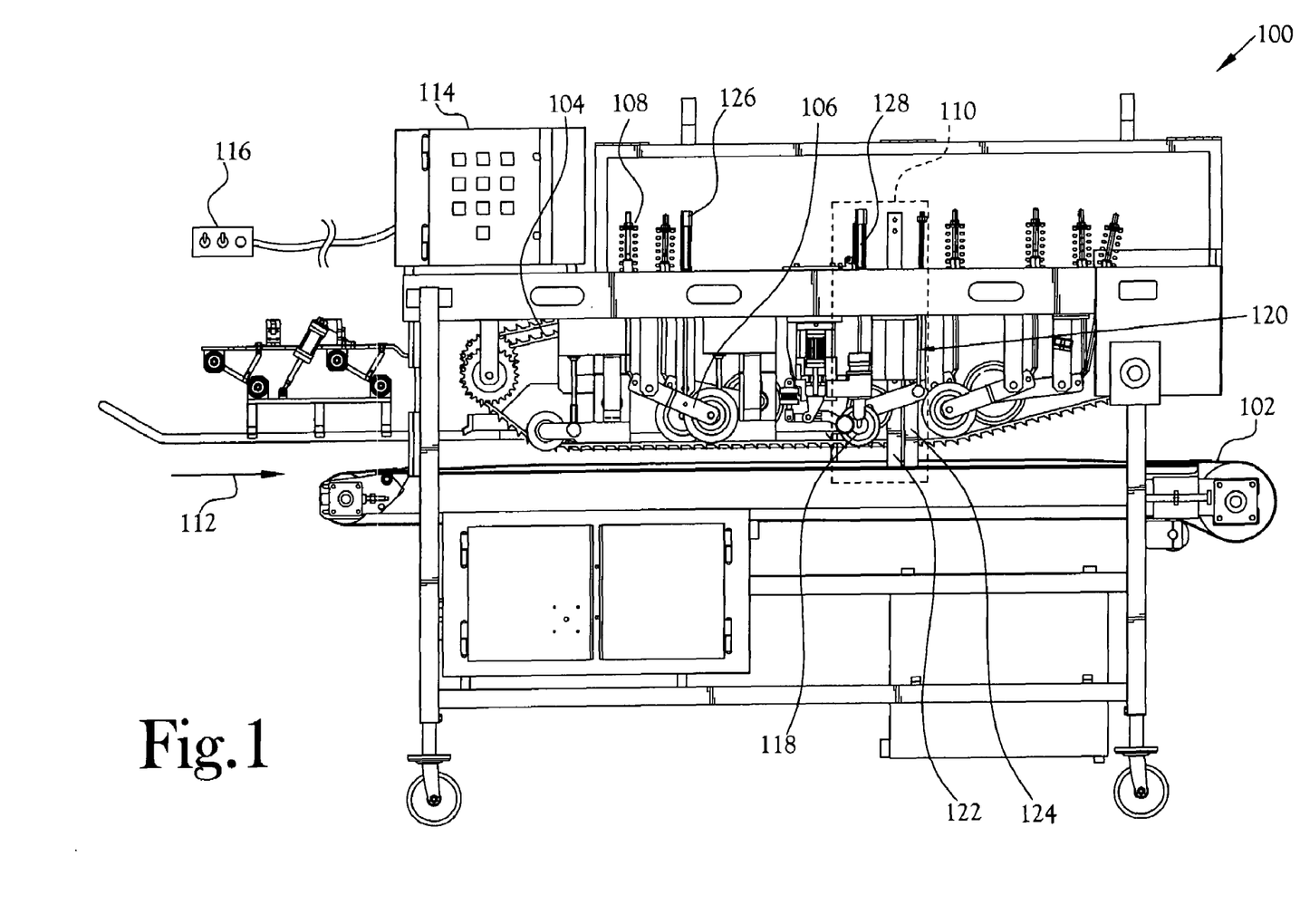
FIG. 1 illustrates a front side elevation view of a contour-following loin puller.

FIG. 1 illustrates a side view of one embodiment of the contour-following loin puller 100 of the present invention. Generally, the contour-following loin puller 100 includes a conveyor 102 and at least one chain drive 104 having a series of downwardly-biased guide arms 106. In one embodiment, each guide arm 106 is tensioned by a corresponding spring 108; however, those skilled in the art will recognize other mechanisms for biasing the guide arms 106 without departing from the scope and spirit of the present invention. The chain drives 106 cooperate with the conveyor 102 to move the carcass middle through the loin puller toward the blade area 110 in the direction indicated by the arrow 112. In one embodiment, the chains of the chain drives 104 incorporate a series of teeth to engage and pull a carcass middle through the loin puller 100. Similarly, the conveyor 102 provides a gripping belt surface designed to engage and pull the carcass middle through the loin puller 100. The loin puller includes a stationary control box 114 from which an operator can control the operation of the loin puller and make adjustments to the cutting profiles. A tethered remote control 116 allows the operator freedom to operate the contour-following loin puller 100 away from the location of the stationary control box 114.

The blade area 110 is home to a scribe saw 118 and a carcass middle blade assembly 120. The scribe saw 118 cuts through the rib bones and into the carcass middle to a selected depth creating a kerf. The scribe saw 118 is capable of movement in both the horizontal and vertical directions to control the position and depth of the kerf. A depth gauge associated with the scribe saw 118 limits the depth of the kerf and the vertical speed of the scribe saw, decelerating the vertical movement of the scribe saw as it approaches the selected depth. The carcass middle blade assembly 120 includes two separate blades, each with a unique purpose. The first blade 122, referred to as the "z-blade," separates the loin from the belly leaving the skin and fatback intact on the loin portion. The z-blade 122 passes through the kerf created by the scribe saw 118, allowing the z-blade 122 to separate the loin from the belly without contacting the rib bones. The second blade 124, referred to as the "j-blade," trims fatback from the loin. A loin puller incorporating the dual-blade carcass middle blade assembly 120 is fully described in U.S. Pat. No. 6,547,658, which is incorporated in by reference as if fully set forth herein.

The contour-following loin puller of the present invention includes at least one sensor used to gauge the surface height of the rib line. In one embodiment, the primary height sensor 126 makes early contact with the carcass middle and provides an initial height value for the carcass middle. The secondary height sensor 128 is positioned proximate to the z-blade 122 and measures the surface height of the rib line to precisely control the cut made by the z-blade 122. In the illustrated embodiment, the secondary height sensor 128 is connected to the scribe saw 118, however those skilled in the art will recognize that the secondary height sensor could be mounted and implemented in other ways.

Figure 2:
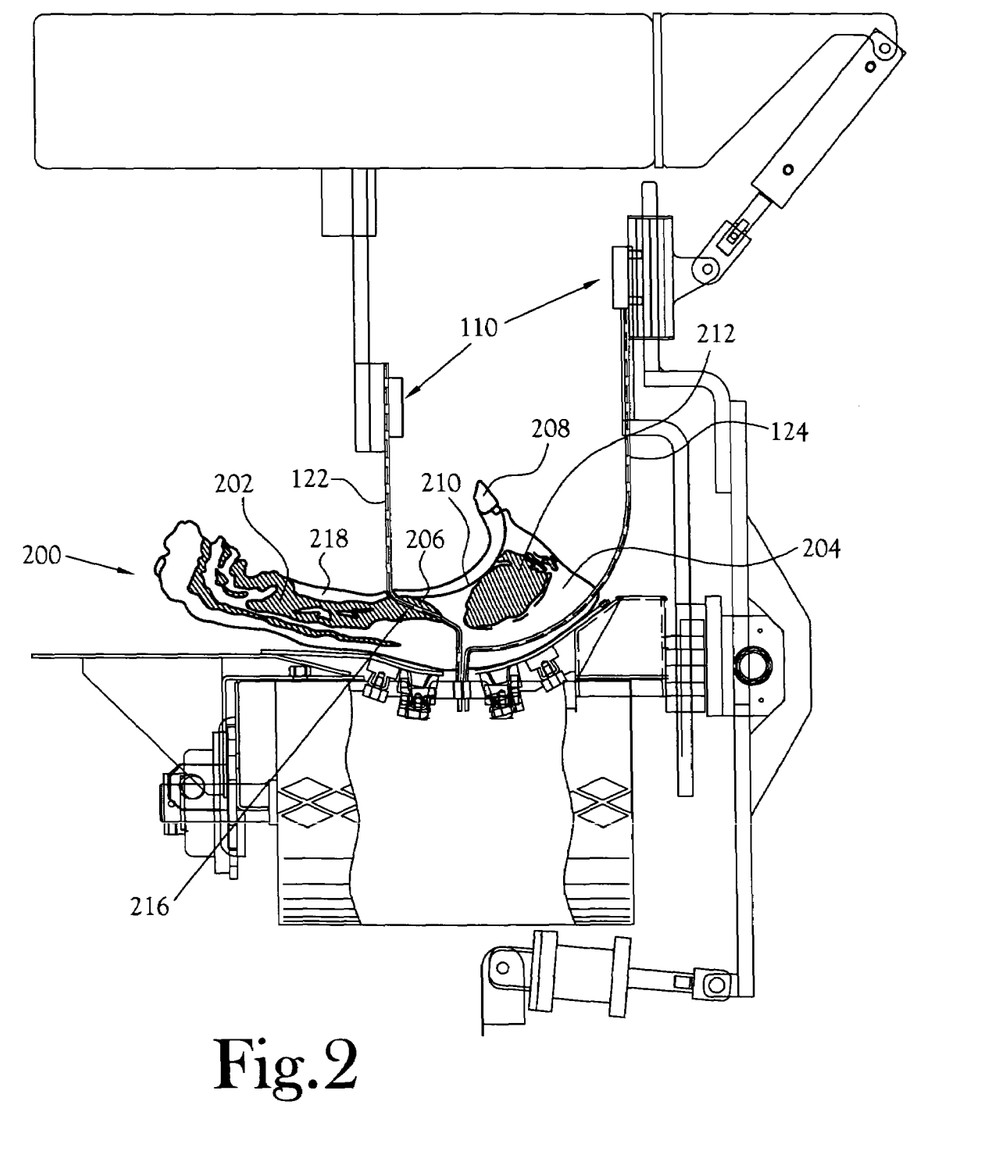
FIG. 2 illustrates an end view of one embodiment of the contour-following loin puller generally illustrating the carcass middle blade assembly engaging a carcass middle.

FIG. 2 illustrates an end view of the contour-following loin puller 100 illustrating the distinctive shapes and arrangement of the blades of the carcass middle blade assembly 110 as it processes a carcass middle 200. In the illustrated embodiment, the carcass middle 200 is a pork loin having a belly portion 202 being separated from the loin portion 204 through an area of finger lean 206 by the z-blade 122. The scribe saw 118 cuts through at least a portion of the rib section leaving the spare ribs 218 attached to the belly portion 202. The loin portion 204 includes the chine 208, the baby-back ribs 210 and the loin 212 itself.

The z-blade 122 is configured to slice through the finger lean 206 and create a shelf 216 on the belly portion 202 leaving a portion of the finger lean 206 on both the belly portion 202 and the loin portion 204. In one embodiment, the shelf 216 has a width of between approximately 2- and 2.625-inches but those skilled in the art will recognize that the width can vary outside this range without departing from the scope and spirit of the present invention. The z-blade 122 cuts through virtually the entire length of the finger lean 206, which includes a portion of the serratus dorsalis muscle. Cutting through the finger lean 206 increases the amount of exposed lean meat on the belly portion 202 and increases the useable size of the belly portion 202. This is particularly important in markets that trade in commodity bellies.

Figure 3:
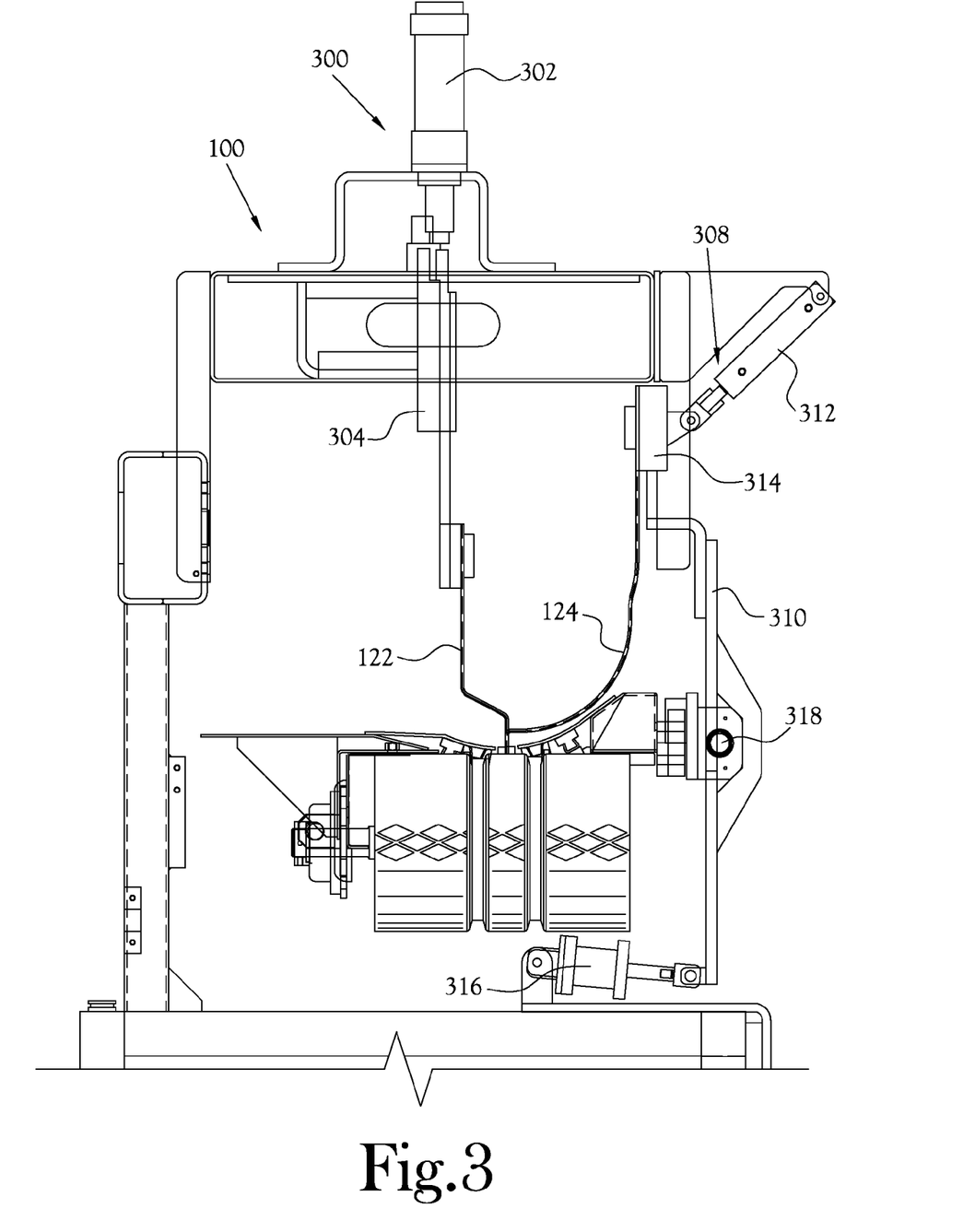
FIG. 3 illustrates an end view of one embodiment of an unloaded contour-following loin puller generally illustrating the carcass middle blade assembly.

FIG. 3 illustrates an end view of the contour-following loin puller 100 focusing on the carcass middle blade assembly 110 without the carcass middle 200 present. In the illustrated embodiment, the elongated lower ends of both the z-blade 122 and the j-blade 124 are inserted into blade support slots that secure them against horizontal movement while allowing vertical movement.

The z-blade positioner 300 carries the upper end of the z-blade 122 allowing it to be moved to separate the loin and the belly. In the illustrated embodiment, the z-blade positioner 300 includes an actuator 302 that controls the horizontal movement of the z-blade 122. The actuator 302 connects to the upper end of the z-blade through a linkage member 304 and controls the range of movement of the upper end of the z-blade 122. In an alternate embodiment, separate actuators are used to independently control the horizontal and vertical movement of the z-blade 122.

A j-blade positioner 308 carries the upper end of the j-blade 124 allowing it to be moved to trim the fatback as desired. In the illustrated embodiment, the j-blade positioner 308 includes a pivotally-mounted member 310 secured at each end by an actuator 312, 316. The upper actuator 312 primarily controls the vertical movement of the slide 314 to which the upper end of the j-blade 124 is attached. The lower actuator 316 primarily controls the horizontal movement of the upper end of the j-blade 124 by pivoting the member 310 about a pivot point 318. In an alternate embodiment, a second j-blade positioner (not shown) provides independent vertical movement to the lower end of the j-blade 124.

Figure 4:
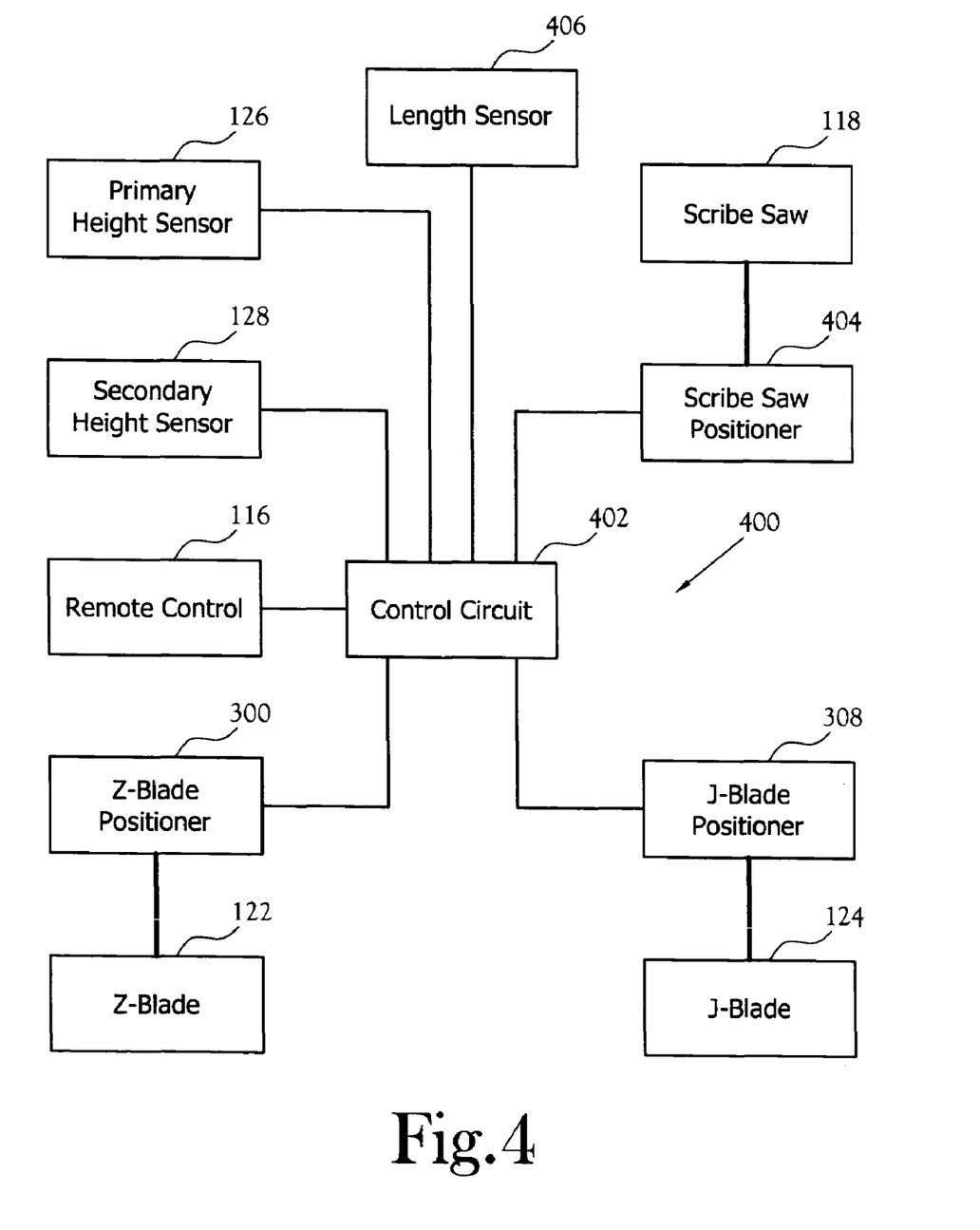
FIG. 4 is a block diagram of the electromechanical automatic contour-following circuit of the present invention.

FIG. 4 is a block diagram of the electromechanical circuit 400 controlling the contour-following loin puller 100. A control circuit 402 automates the operation of the contour-following loin puller 100 using information from the primary height sensor 126 and the secondary height sensor 128. By controlling the z-blade positioner 300, the j-blade positioner 308, and the scribe saw positioner 404, the control circuit 402 precisely controls the separation of the loin and the belly with a high degree of accuracy. Finally, a length sensor 406, typically embedded in the conveyor area, monitors the length of the carcass middle 200 allowing the control circuit 402 to adjust the operation of the contour-following loin puller 100 based upon the length of the carcass middle as desired. In another embodiment, control of the j-blade positioner 308 is retained by the operator.

The primary height sensor 126 provides an initial surface height measurement of the rib line to the control circuit 402. Using the initial height measurement, the control circuit 402 sets the preliminary position of the z-blade 122 and/or the j-blade 124 through the corresponding positioners 300, 308.

The secondary height sensor 128 also measures the surface height of the rib line proximate to the z-blade 122. Using the measurement obtained from the secondary height sensor 128, the control circuit 402 moves the z-blade 122, through z-blade positioner 300, to follow the contour of the surface rib line and cut through the finger lean 206 to separate the loin 204 from the belly 202. In one embodiment, the secondary height sensor 128 measures the surface height of the rib line next to the cut made by the scribe saw so that the measurement is taken directly above the area of finger lean to be cut.

Once the control circuit 402 has the information from the secondary height sensor 128, the position to which to move the z-blade 122 is determined. There are various ways of determining the proper position of the z-blade 122 in one embodiment, the position of the z-blade 122 is adjusted by an offset relative to the measured surface height of the rib line. In another embodiment, the position of the z-blade is determined by statistical analysis of the carcass middle. The z-blade positions can be calculated or obtained from a look-up table.

Using a fixed offset from the measured surface height of the rib line determined by the secondary height sensor 128 allows the z-blade 122 to consistently separate the loin 204 from the belly 202 through the finger lean 206. The fixed offset is determinable through statistical analysis of the physical characteristics of pigs raised for slaughter. Contour following eliminates the need for processor intensive calculations or memory reads and allows a motion controller to control the position of the z-blade at a fixed offset relative to the value measured by the secondary height sensor while achieving approximately 98% accuracy.

Those skilled in the art will recognize the various components that can be used to implement the electromechanical circuit 400. In the illustrated embodiment, the primary height sensor 126 and the secondary height sensor 128 are displacement sensors, such as internal linear variable differential transducers, capable of registering vertical position changes. Those skilled in the art will recognize other sensors that can be used, including, but not limited to, external linear variable differential transducers, ultrasonic distance sensors, laser distance sensors, and optical distance sensors. In one embodiment the logical functions of the control circuit 402 are implemented using a programmable logic controller and a motion controller. Those skilled in the art will recognize other processing devices that can be used to implement the control circuit of the contour-following loin puller without departing from the scope and spirit of the present invention. Such processing devices include programmable interrupt controllers, processors and microprocessors, and discrete logic components.

Figure 5:
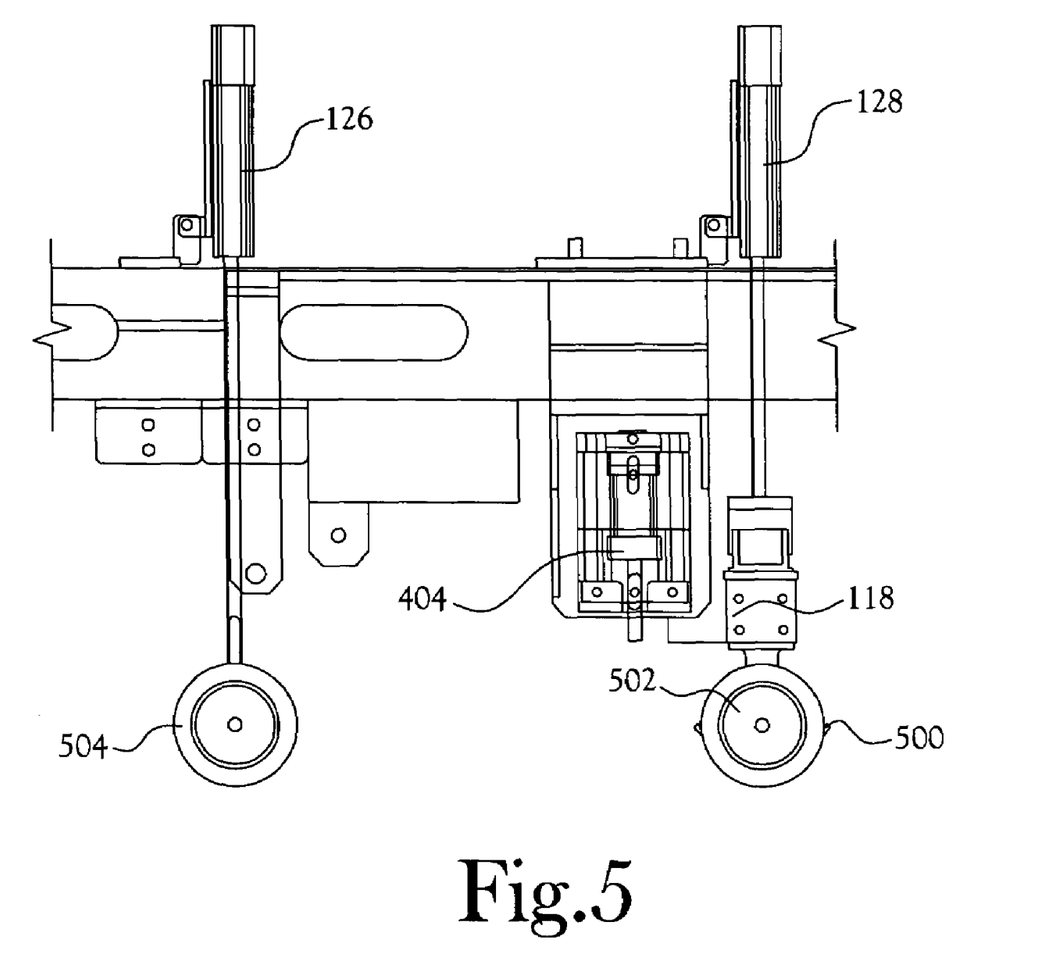
FIG. 5 illustrates a front side elevation view of a portion of the contour-following loin puller detailing the sensor.

FIG. 5 is a side elevation view of the portion of the contour-following loin puller 100 detailing the primary height sensor 126 and the secondary height sensor 128. The illustrated primary height sensor 126 ends with a guide wheel 504 adapted to make contact with and roll over the surface of the carcass middle 200. The primary height sensor 126 produces an output based upon the displacement resulting from the engagement with the carcass middle 200, which can be corrected to account for the sinusoidal effects introduced by the rotation of the guide wheel. Similarly, the illustrated secondary height sensor 128 is physically connected to the scribe saw 118 and measures the displacement of the scribe saw 118. A stop 500 limits the travel of the scribe saw 118 and maintains contact with the surface of the rib line. In the illustrated embodiment, the stop 500 is located on the back side of the scribe saw blade holder 502.

Figure 6:
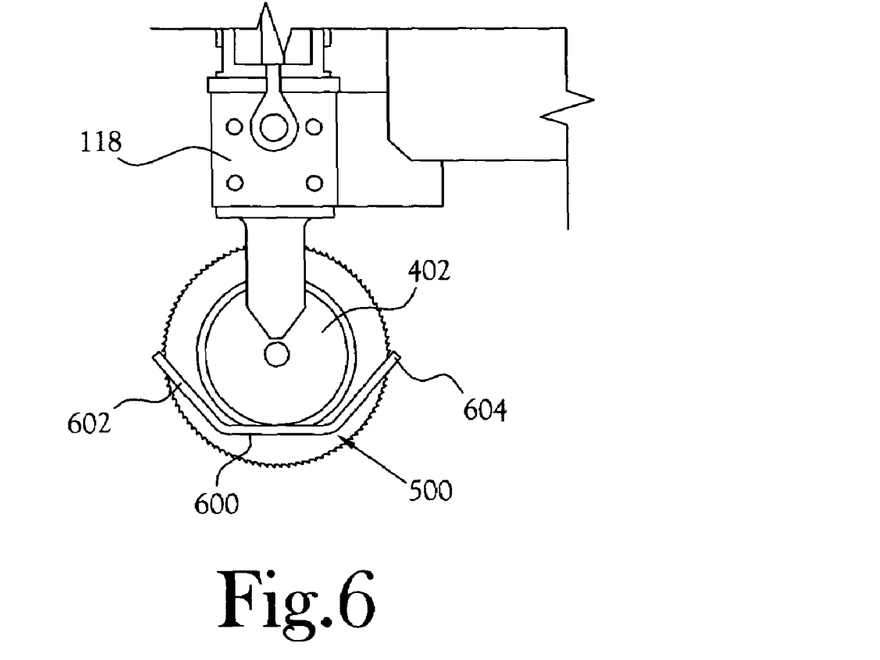
FIG. 6 illustrates a rear side elevation view of one embodiment of the scribe saw assembly for the contour-following loin puller.

FIG. 6 is a rear elevation view of one embodiment of the scribe saw assembly 118 for use with the secondary height sensor 128 showing the stop 500. In the illustrated embodiment, the stop 500 is a ski mounted to the inside of the scribe saw assembly 118 at the bottom of the blade holder 502. The ski 500 includes a central portion 600 substantially aligned parallel to the conveyor 102. Each end of the ski 500 is bent to form an angular portion 602, 604 so that the ski 500 does not present sharp edges or corners. The angular members 602, 604 allow the ski 500 to engage and slide over the carcass middle 200 without catching. The ski 500 effectively rests upon the surface of the rib line 210 next to the kerf created by the scribe saw 118 and directly over the finger loin 206 through which the z-blade 122 should cut to separate the loin 204 and the belly 202. The height measured by the secondary height sensor 128 as the ski 500 follows the surface contour of the rib line provides the basis for the positioning of the z-blade. The secondary height sensor 128 employing the ski 500 works well when processing hard or frozen product.

Figure 7:
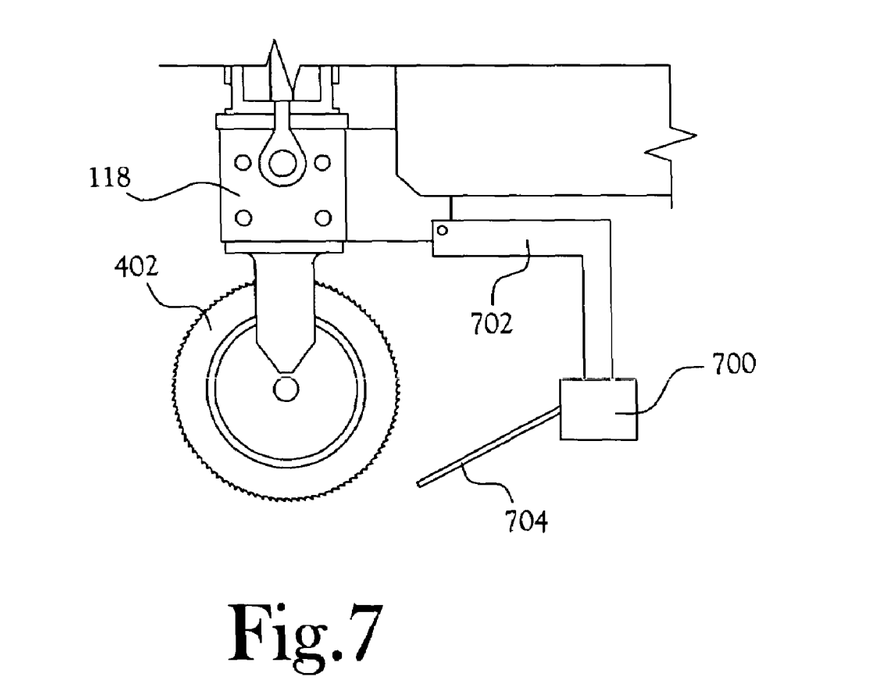
FIG. 7 illustrates a rear side elevation view of an alternate embodiment of the scribe saw assembly for the contour-following loin puller.

FIG. 7 is an alternate embodiment of a secondary height sensor 600 using a pivoting member 604 to track the contour of the surface rib line. In the illustrated embodiment, the secondary height sensor is connected to the scribe saw assembly 118 by a bracket 602. Those skilled in the art will recognize that the secondary height sensor can be mounted in other locations, independent of the scribe saw assembly 118, without departing from the scope and spirit of the present invention. The alternate embodiment of the secondary height sensor 600 is suitable for use with soft or hard product.

Figure 8:
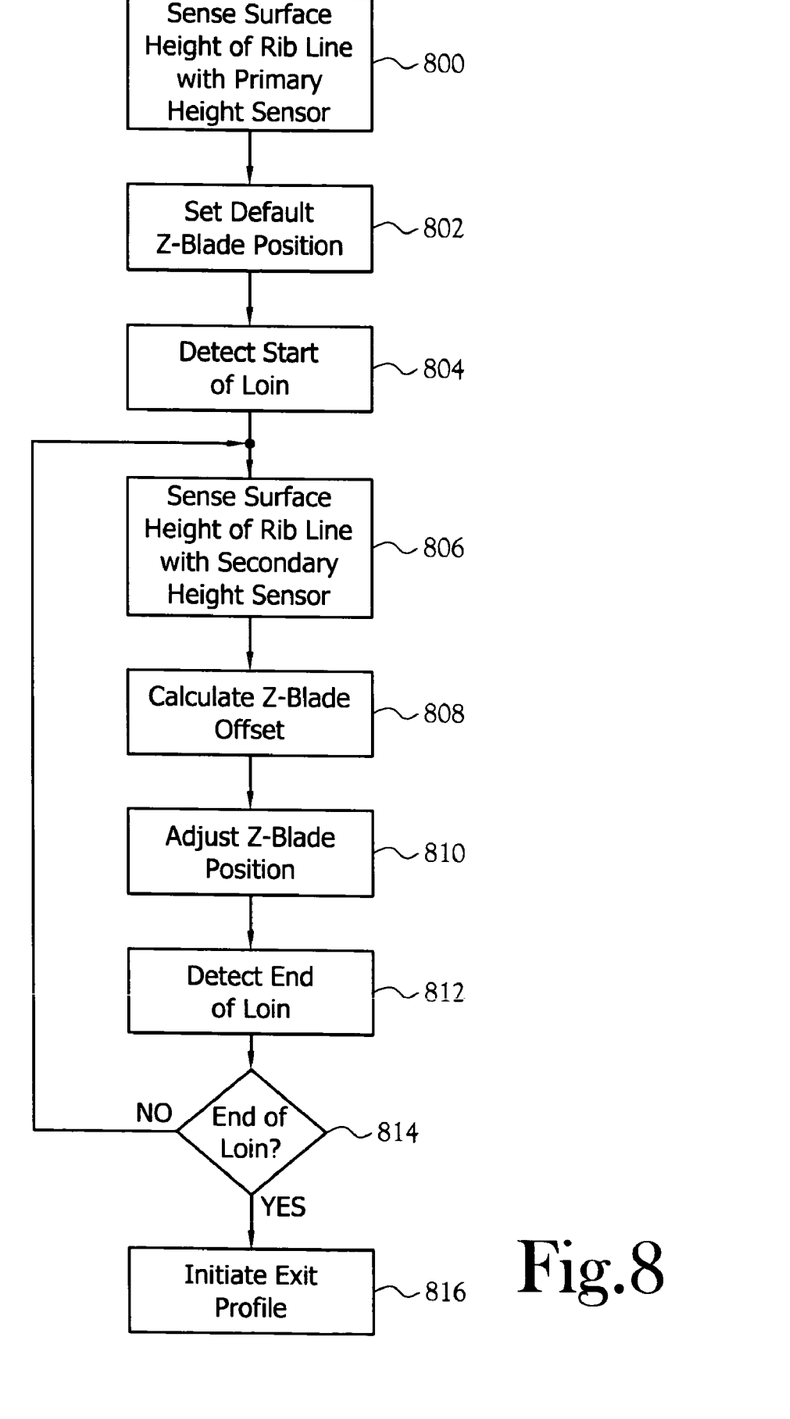
FIG. 8 is a flow diagram of one embodiment of a method for automatically following the contour of a carcass middle being processed.

FIG. 8 illustrates a general flow diagram of the operation of the contour-following loin puller 100. A carcass middle 200 is loaded onto the conveyor 102 of the contour-following loin puller 100. As the conveyor 102 moves the carcass middle 200 through the contour-following loin puller 100, the carcass middle 102 is straightened and aligned to accommodate the scribe saw 118, the z-blade 122, and the j-blade 124. The primary height sensor 126 measures the height of the carcass middle 200 in step 800. The contour-following loin puller 100 positions the z-blade 122 using a base offset in step 802 using the measurement obtained in step 800. This measurement allows preliminary positions for the various blades to be set before actual processing of the loin begins and offers the ability to select a loin processing profile based upon the size of the carcass middle 200. Loin processing starts when the presence of a carcass middle 200 is detected in step 804. Presence detection occurs when the carcass middle 200 engages a trigger mechanism, typically located in the bed of the conveyor 102. In one embodiment, the trigger mechanism is the length sensor 404. The secondary height sensor 128 senses the surface height of the rib line in step 806. By making the height measurement near the z-blade 122 and/or the scribe saw 118, the measurement is the direct result of positive contact and the location of the measurement is directly over the finger lean 206 where the loin 202 and the belly 204 should be separated.

Using the height measured by the secondary height sensor 128, the offset to the position of the z-blade 122 is determined in step 808. In one embodiment, the rib height is subtracted from the measured surface height of the rib line to determine the proper z-blade offset. Through statistical analysis of pig physiology, the relationship between the surface of the rib line and the depth of the z-blade necessary to separate the loin and the belly through the finger lean has been determined. If has been found that positioning the z-blade at a fixed offset relative to the surface height of the rib line allows the z-blade to separates the loin and the belly through the finger lean, in most cases, and effectively increases the yield of the loin pulling process, typically reducing the number of damaged or reduced value cuts to approximately two percent. In addition to relying on a fixed value, the controller can use a variable offset using an estimated rib height. One way is to use a lookup table containing statistical information about rib heights relative to the overall height of the loin. Another embodiment, calculates the rib height as a percentage of the overall loin height. Other techniques for determining the rib height involve the use of a sensor, such as a camera or an ultrasonic sensor, to determine the rib height for the particular carcass middle rather than relying on statistical information. Once the z-blade offset has been determined, the z-blade positioner 300 moves the z-blade 122 in response to commands from the motion controller of the control circuit 402 in step 810.

Detection of the end of the loin is another feature of the contour-following loin puller 100 as shown in step 812. When the end of the loin is reached, as determined in step 814, the exit profile for finishing the loin is applied in step 816. The exit profile allows custom finishes for the loin to be selected by the operator. If it is determined that the end of the loin has not been reached, the contour-following loin puller continues to measure the loin height and adjust the offset of the z-blade accordingly, beginning again with step 806.

A contour-following loin puller capable of automatically following the contour of a loin has been shown and described. The primary height sensor allows preliminary height information to be obtain and loin processing profiles to be selected. The secondary height sensor proximate to the z-blade allows the contour-following loin puller to sense the surface height and follow the contour of the rib line. Using the information obtained from the secondary height sensor, the contour-following loin puller adjusts the position of the z-blade to separate the loin and the belly through the finger lean which increases the value of the processed meat cuts. The z-blade position is determined by subtracting a value representing the rib thickness from the total height of the carcass middle.

While at least one embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A meat processing apparatus for processing a carcass middle having a rib section, a loin, and a belly with an area of finger lean inbetween, said meat processing apparatus comprising:

a conveyor for carrying a carcass middle having a bottom surface, a top surface, a rib line, and a loin, said conveyor having a surface adapted to grip the bottom surface of the carcass middle;

a chain drive biased towards said conveyor and adapted to engage the carcass middle, said chain drive cooperating with said conveyor to move the carcass middle, said chain drive including a plurality of guide arms biased towards said conveyor and a plurality of guide wheels, each guide wheel carried by one of said plurality of guide arms, said plurality of guide wheels providing a track for a chain, said chain adapted to grip the top surface of the carcass middle;

a scribe saw for cutting through at least a portion of the carcass middle creating a kerf of a selected depth, said scribe saw being horizontally and vertically positionable to control the position and depth of the kerf;

a z-blade having a cutting surface, said z-blade cutting surface positioned to separate the loin from the belly through the finger lean, said z-blade passing through the kerf created by said scribe saw;

a z-blade positioner connected to said z-blade, said z-blade positioner adapted to move said z-blade in at least a horizontal direction;

a j-blade having a cutting surface, said j-blade cutting surface positioned to remove a layer of fatback around said loin;

a j-blade positioner connected to said j-blade, said j-blade positioner adapted to move said j-blade vertically and horizontally;

a primary height sensor adapted to detect an initial surface height of the carcass middle, said primary height sensor producing a first output corresponding to the initial surface height;

a secondary height sensor adapted to detect a surface height of the rib line proximate to said z-blade, said secondary height sensor producing a second output corresponding to the surface height utilized to actuate the exact position of the z-blade enabling the contour following of the rib line; and a control circuit in communication with said primary height sensor, said secondary height sensor, and said z-blade positioner, said control circuit performing a method comprising the steps of:
actuating said z-blade positioner to move said z-blade to an initial position based upon said first output;
determining a current position of the rib line based upon said second output;
calculating a z-blade height based upon said current position of the rib line; and
actuating said z-blade positioner to move said z-blade to said z-blade height so as to separate the loin from the belly cutting through the finger lean leaving a portion of the finger lean on the loin and a portion of the finger lean on the belly.

2. The meat processing apparatus of claim 1 wherein said secondary height sensor is a linear transducer adapted to engage the carcass middle proximate to said z-blade.

3. The meat processing apparatus of claim 1 further comprising a stop carried by said scribe saw, said stop limiting movement of said scribe saw relative to the top surface of the carcass middle, said stop sliding along the contour of the top surface of the carcass middle.

4. The meat processing apparatus of claim 1 wherein said control circuit is in communication with said j-blade positioner, said method performed by said control circuit further comprising the step of actuating said j-blade positioner to move said j-blade to remove a layer of fatback from said loin.

5. The meat processing apparatus of claim 1 wherein said control circuit includes a motion controller moving said z-blade at fixed offset relative to said second output from said secondary height sensor.

6. The meat processing apparatus of claim 1 wherein each of said primary height sensor and said secondary height sensor is selected from group consisting of an internal linear transducer, an external linear transducer, a laser distance sensor, an ultrasonic distance sensor, and an optical distance sensor.

7. A meat processing apparatus for processing a carcass middle having a rib section, a loin, and a belly with an area of finger lean inbetween, said meat processing apparatus comprising:
a conveyor for carrying a carcass middle having a surface rib line and a loin, said conveyor having a surface adapted to grip the carcass middle;
a drive engaging an upper surface of the carcass middle, said drive cooperating with said conveyor to move the carcass middle, said chain drive including a plurality of guide arms biased towards said conveyor and a plurality of guide wheels, each guide wheel carried by one of said plurality of guide arms, said plurality of guide wheels providing a track for a gripping member,
a scribe saw for cutting through at least a portion of the carcass middle creating a kerf of a selected depth, said scribe saw being horizontally and vertically positionable to control the position and depth of the kerf;
a z-blade having a cutting surface, said z-blade cutting surface positioned to separate the loin from the belly through the finger lean, said z-blade passing through the kerf created by said scribe saw;
a z-blade positioner connected to said z-blade, said z-blade positioner adapted to move said z-blade vertically and horizontally;
a primary height sensor adapted to detect an initial surface height of the carcass middle, said primary height sensor producing a first output corresponding to the initial surface height;
a secondary height sensor following a surface height of the carcass middle along said rib line proximate to said z-blade, said secondary height sensor producing a second output corresponding to the surface height;
a control circuit in communication with said primary height sensor, said secondary height sensor, and said z-blade positioner, said control circuit positioning said z-blade based upon inputs from said primary height sensor and said secondary height sensor such the loin is separated from the belly by cutting through the finger lean and leaving a portion of the finger lean on the loin and a portion of the finger lean on the belly.

8. The meat processing apparatus of claim 7 wherein said scribe saw includes a stop for limiting movement of the scribe saw relative to a top surface of the carcass middle, said stop sliding along the contour of the top surface of the carcass middle.

9. The meat processing apparatus of claim 7 wherein each of said primary height sensor and said secondary height sensor is selected from group consisting of an internal linear transducer, an external linear transducer, a laser distance sensor, an ultrasonic distance sensor, and an optical distance sensor.

10. The meat processing apparatus of claim 7 wherein said control circuit includes a motion controller moving said z-blade at a fixed offset relative to said second output.

11. The meat processing apparatus of claim 7 wherein said control circuit sets an initial entry position of said z-blade based upon an input from said primary height sensor.

12. The meat processing apparatus of claim 7 further comprising:
a j-blade having a cutting surface, said j-blade cutting surface positioned to remove a layer of fatback around said loin; and
a j-blade positioner connected to said j-blade, said j-blade positioner adapted to move said j-blade vertically and horizontally, said j-blade positioner responsive to said control circuit.

13. A meat processing apparatus for processing a carcass middle having a rib section, a loin, and a belly with an area of finger lean inbetween, said meat processing apparatus comprising:
a conveyor for carrying a carcass middle having a surface rib line and a loin, said conveyor having a surface adapted to grip the carcass middle;
a scribe saw for cutting through at least a portion of the rib section of the carcass middle creating a kerf of a selected depth, said scribe saw being horizontally and vertically positionable to control the position and depth of the kerf;
a z-blade having a cutting surface, said z-blade cutting surface positioned to separate the loin from the belly through the finger lean, said passing through the kerf created by said scribe saw;
a z-blade positioner connected to said z-blade, said z-blade positioner adapted to move said z-blade vertically and horizontally;
a contour height sensor adapted to detect a surface height of the rib line proximate to said z-blade; and
a control circuit in communication with said contour height sensor and said z-blade positioner, said control circuit positioning said z-blade based upon inputs from said contour height sensor allowing the loin to be separated from the belly through the finger lean and leaving a portion of the finger lean on the loin and a portion of the finger lean on the belly.

14. The meat processing apparatus of claim 13 further comprising a drive engaging an upper surface of the carcass middle, said drive cooperating with said conveyor to move the carcass middle.

15. The meat processing apparatus of claim 13 wherein said scribe saw includes a stop for limiting movement of the scribe saw relative to a top surface of the carcass middle, said stop sliding along the contour of the top surface of the carcass middle.

16. The meat processing apparatus of claim 13 wherein said contour height sensor is selected from group consisting of an internal linear transducer, an external linear transducer, a laser distance sensor, an ultrasonic distance sensor, and an optical distance sensor.

17. The meat processing apparatus of claim 13 wherein said control circuit includes a motion controller moving said z-blade at fixed offset relative to said contour height sensor.

18. The meat processing apparatus of claim 13 further comprising:

a j-blade having a cutting surface, said j-blade cutting surface positioned to remove a layer of fatback around said loin; and a j-blade positioner connected to said j-blade, said j-blade positioner adapted to move said j-blade vertically and horizontally, said j-blade positioner controlled by said control circuit.

19. The meat processing apparatus of claim 13 further comprising a primary height sensor adapted to detect an initial surface height of the carcass middle, said control circuit being responsive to said primary height sensor to set an initial entry position for z-blade.

* * * * *